(12) United States Patent
Kurosawa et al.

(10) Patent No.: US 7,733,406 B2
(45) Date of Patent: Jun. 8, 2010

(54) IMAGE SIGNAL GENERATION UNIT, DIGITAL CAMERA, AND IMAGE SIGNAL GENERATION METHOD

(75) Inventors: Kazuyuki Kurosawa, Iruma (JP); Osamu Koizumi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/492,006

(22) Filed: Jun. 25, 2009

(65) Prior Publication Data

US 2009/0262241 A1    Oct. 22, 2009

Related U.S. Application Data

(62) Division of application No. 10/532,034, filed as application No. PCT/JP03/015013 on Nov. 25, 2003, now abandoned.

(30) Foreign Application Priority Data

Nov. 25, 2002 (JP) .............................. 2002-340951
Sep. 17, 2003 (JP) .............................. 2003-324659

(51) Int. Cl.
H04N 5/222 (2006.01)
H04N 7/01 (2006.01)
G09G 5/02 (2006.01)

(52) U.S. Cl. ....................... 348/333.11; 348/333.12; 348/333.01; 348/441; 348/453; 345/698

(58) Field of Classification Search ................ 348/453, 348/441, 445, 450, 554, 555, 556, 557, 565, 348/581, 333.11, 333.12, 333.01, 222.1, 348/223.1; 345/604, 605, 660, 694, 695, 345/696, 697, 698, 699

See application file for complete search history.

(56) References Cited

U.S. PATENT DOCUMENTS 5,463,422 A * 10/1995 Simpson et al. .......... 348/390.1
5,657,082 A *  8/1997 Harada et al. ............... 348/262

(Continued)

FOREIGN PATENT DOCUMENTS

EP        0 975 155 A2    1/2000

(Continued)

OTHER PUBLICATIONS

Wei-Hsin Chan et al; Video CCD Based Portable Digital Still Camera; IEEE Transactions on Consumer Electronics; Aug. 1995; No. 3, New York; pp. 455-459.

(Continued)

*Primary Examiner*—Tuan Ho
*Assistant Examiner*—Marly Camargo
(74) *Attorney, Agent, or Firm*—Frishauf, Holtz, Goodman & Chick, P.C.

(57) ABSTRACT

An image signal generation unit comprises a horizontal pixel number conversion unit for performing the conversion of horizontal direction pixels corresponding to horizontal scanning period of NTSC system, for digital image data of the chrominance difference having the picture element number configuration based on the VGA standard, and a liquid crystal encoder for generating the primary color group digital image data RGB from digital image data YUV processed by the horizontal pixel number conversion unit, and output them directly on a liquid crystal display.

4 Claims, 8 Drawing Sheets

U.S. PATENT DOCUMENTS

| | | | |
|---|---|---|---|
| 5,875,304 A * | 2/1999 | Winter et al. | 395/200.61 |
| 6,144,411 A | 11/2000 | Kobayashi et al. | |
| 6,252,590 B1 * | 6/2001 | Sawai et al. | 345/667 |
| 6,480,230 B1 * | 11/2002 | Honma | 348/443 |
| 6,639,627 B1 | 10/2003 | Takezawa et al. | |
| 6,674,464 B1 | 1/2004 | Mizutani et al. | |
| 6,678,000 B1 * | 1/2004 | Sakata | 348/369 |
| 6,937,217 B2 * | 8/2005 | Klompenhouwer et al. | 345/87 |
| 6,982,756 B2 * | 1/2006 | Nakamura | 348/241 |
| 7,358,992 B2 * | 4/2008 | Mizutani et al. | 348/231.99 |
| 2001/0006579 A1 | 7/2001 | Inoue et al. | |
| 2002/0008760 A1 | 1/2002 | Nakamura | |
| 2002/0027615 A1 * | 3/2002 | Ohtsuki | 348/561 |
| 2002/0041761 A1 | 4/2002 | Glotzbach et al. | |
| 2002/0071039 A1 * | 6/2002 | Hamasaki et al. | 348/220 |

FOREIGN PATENT DOCUMENTS

| | | | |
|---|---|---|---|
| EP | 1 175 101 A1 | 1/2002 | |
| JP | 2000-092361 A | 3/2000 | |
| JP | 2000-293145 A | 10/2000 | |
| JP | 2000293145 A | * 10/2000 | |
| JP | 2001-054134 A | 2/2001 | |
| JP | 2001-54134 A | 2/2001 | |
| WO | WO 01/91102 A1 | 11/2001 | |
| WO | WO 02/077956 A2 | 10/2002 | |

OTHER PUBLICATIONS

Takuya Imaide et al; A Multimedia Color Camera Providing Multi-Format Digital Images; IEEE Transactions on Consumer Electronics; Aug. 1993, No. 3, New York; pp. 467-472.

Vesa (Video Electronics Standards Association); Plug and Display Standard; Version 1, Jun. 11, 1997; pp. 1-109.

NEC: "Source Driver for 300/288-Output TFT-LCD" [Online] Apr. 2002, retrieved from the Internet: URL:http://www.ee.nec.de/_pdf/S15806EJ2V0P M00.PDF> [retrieved on Apr. 11, 2006]. NEC Corporation, Japan.

* cited by examiner

IMAGE SIGNAL GENERATION UNIT, DIGITAL CAMERA, AND IMAGE SIGNAL GENERATION METHOD

CROSS-REFERENCE TO RELATED APPLICATIONS

The present application is a Divisional Application of U.S. application Ser. No. 10/532,034 filed Apr. 21, 2005 now abandoned, which is incorporated herein by reference and which is a U.S. National Phase Application under 35 USC 371 of International Application PCT/JP2003/15013 filed Nov. 25, 2003.

TECHNICAL FIELD

The present invention relates to an image signal generation unit and method for generating image signals to be output to a display panel, and a digital camera.

BACKGROUND ART

A digital camera has an encoder circuit for generating, from YUV signals obtained by imaging, analog video signals or RGB signals for external output, and analog RGB signals for driving a liquid crystal finder. The analog RGB signals for driving the liquid crystal finder are generated by sampling the analog video signals or the RGB signal for external output at a sampling rate corresponding to the number of pixels of a liquid crystal finder.

Unexamined Japanese Patent Applications KOKAI Publication 2001-054134 discloses another type of an encoder circuit which generates, together with analog video signals for external output, and digital RGB signals to be directly supplied to the driving circuit of a TFT liquid crystal display panel constituting the liquid crystal finder.

Image data obtained by imaging in general have a VGA (Video Graphics Array) based pixel configuration of 480 vertical pixels×640 horizontal pixels, which is actually the defacto standard of image processing.

In the case, the video signals to be externally output for Japan's standard television system NTSC are generated from the image data having the VGA pixel number, image data having 704 pixels are generated by multiplying the horizontal pixel number of the VGA by 11/10, by sampling the image data at a frequency of 13.5 MHz derived from the scanning time for one horizontal line. The image data with the horizontal pixel number increased for external output are sampled by a sampling frequency matching with the number of pixels constituting the liquid crystal display panel, and then drives the liquid crystal display with the image data. Ultimately, an image having the VGA aspect ratio of 3:4 is displayed on the liquid crystal display pane.

As described above, the video signals for external output and the signals for liquid crystal display of the finer require each different horizontal pixel numbers, without any correlation between the two pixel numbers. The problem is that the size has to be large of an encoder circuit capable of generating, and outputting, video signals and liquid crystal display signals out of image data provided from the imaging system.

The above-quoted literature fails to disclose anything about the actual number of pixels, etc. relative to the digital RGB signals to be generated.

DISCLOSURE OF INVENTION

Accordingly, the first object of the present invention is to provide an image signal generation unit capable of directly driving the display panel by the use of digital image data.

The second object of the present invention is to provide an image signal generation unit, a digital camera, and an image signal generation method with a simple circuit configuration.

An image signal generation unit according to first aspect of the present invention, comprises: horizontal pixel number conversion means for converting horizontal pixel number of digital image data to a number or half the number suitable for generating video signals compliant with the first television system; and first output means for outputting the digital image data with the horizontal pixel number converted by the horizontal pixel number conversion means to a display panel driving circuit, with the display panel horizontal pixel number so set as to be approximately equal to or half the number suitable for generating video signals compliant with the first television system.

An image signal generation unit according to second aspect of the present invention, comprises a video memory for supplying digital image data, a first output means for outputting the digital image data supplied by the video memory to the display panel driving circuit, a first horizontal pixel number conversion means for converting the number of horizontal pixels of the digital image data supplied by the video memory to a horizontal pixel number suitable for generating video signals for the first television system, a first generation means for generating digital video signals compliant with the first television system out of the digital image data with the horizontal pixel number converted by the first horizontal pixel number conversion means, and a second output means for outputting the video signals generated by the first generation means.

An image signal generation unit according to third aspect of the present invention, comprises a horizontal pixel number conversion circuit for converting the digital image data horizontal pixel number to a number, or half the number, suitable for generating video signals compliant with the first television system, and a first output circuit for outputting to the display panel driving circuit the digital image data with the horizontal pixel number converted by the horizontal pixel number conversion circuit, with the display panel horizontal pixel number so set as to be approximately equal to or half the horizontal pixel number suitable for generating video signals compliant with the first television system.

An image signal generation unit according to fourth aspect of the present invention, comprises a video memory for supplying digital video data, a first output circuit for outputting to the display panel driving circuit the digital image signals supplied by the video memory, a first horizontal pixel number conversion circuit for converting the horizontal pixel number of digital image data supplied by the video memory into a horizontal pixel number suitable for generating video signals compliant with the first television system, a first generation circuit for generating digital video signals compliant with the first television system out of the digital image data with the horizontal pixel number converted by the first horizontal pixel number conversion circuit, and a second output circuit for outputting the video signals generated by the first generation circuit.

A digital camera according to fifth aspect of the present invention, comprises an imaging means for imaging the object and outputting the digital image data, a horizontal pixel number conversion means for converting the horizontal pixel number of the digital image data outputted by the imaging means into a number, or half the number, suitable for generating video signals compliant with the first television system, and a first output means for outputting the digital image data, with the horizontal pixel number converted by the horizontal pixel number conversion means, to the display panel driving circuit, with the display panel horizontal pixel number so set as to be approximately equal to or half the horizontal pixel number suitable for generating video signals compliant with the first television system.

A digital camera according to sixth aspect of the present invention, comprises an imaging means for imaging the object and outputting the digital image data, a video memory means for memorizing the digital image data outputted by the imaging means, a first output means for outputting the digital image data, supplied by the video memory means, to the display panel driving circuit, a first horizontal pixel number conversion means for converting the horizontal pixel number of the digital image data, supplied by the video memory means, into a number suitable for generating video signals compliant with the first television system, a first generation means for generating digital video signals, compliant with the first television system, out of the digital image data with the horizontal pixel number converted by the first horizontal pixel number conversion means, and a second output means for outputting video signals generated by the first generation means.

A digital camera according to seventh aspect of the present invention, comprises an imaging circuit for imaging the object and outputting the digital image data, a horizontal pixel number conversion circuit for converting the horizontal pixel number, outputted by the imaging circuit, into a number, or half the number, suitable for generating video signals compliant with the first television system, a first output circuit for outputting the digital image data, with the horizontal pixel number converted by the horizontal pixel number conversion circuit, to the display panel driving circuit, with the display panel horizontal pixel number so set as to be approximately equal to or half the horizontal pixel number suitable for generating video signals compliant with the first television system.

A digital camera according to eighth aspect of the present invention, comprises an imaging circuit for imaging the object and outputting the digital image data, a video memory for storing the digital image data outputted by the imaging circuit, a first output circuit for outputting the digital image data, supplied by the video memory, to the display panel driving circuit, a first horizontal pixel number conversion circuit for converting the digital image data horizontal pixel number, supplied by the video memory, into a number suitable for generating video signals compliant with the first television system, a first generation circuit for generating out of the digital image data, with the horizontal pixel number converted by the first horizontal pixel number conversion circuit, into digital video signals compliant with the first television system, and a second output circuit for outing the video signals generated by the first generation circuit.

An image signal generation method according to ninth aspect of the present invention, comprises the steps of: converting the digital image data horizontal pixel number into a horizontal pixel number, or half the number, suitable for generating video signals compliant with the first television system and outputting the digital image data, with the horizontal pixel number converted, to a display panel driving circuit, with the display panel horizontal pixel number so set as to be approximately equal to or half the horizontal pixel number suitable for generating video signals compliant with the first television system.

An image signal generation method according to tenth aspect of the present invention, comprises: the steps of storing digital image data in a video memory, outputting the digital image data supplied by the video memory to the display panel driving circuit, converting the digital image data horizontal pixel number supplied by the video memory into a horizontal pixel number suitable for generating video signals compliant with the first television system, generating, out of the digital image data with the horizontal pixel number converted, digital video signals compliant with the first television system, and outputting the generated video signals.

BEST MODE FOR CARRYING OUT THE INVENTION

The First Embodiment

The first embodiment of the present invention is explained with reference to drawings, wherein the present invention is applied to an encoder circuit for a digital camera.

Figure 1:
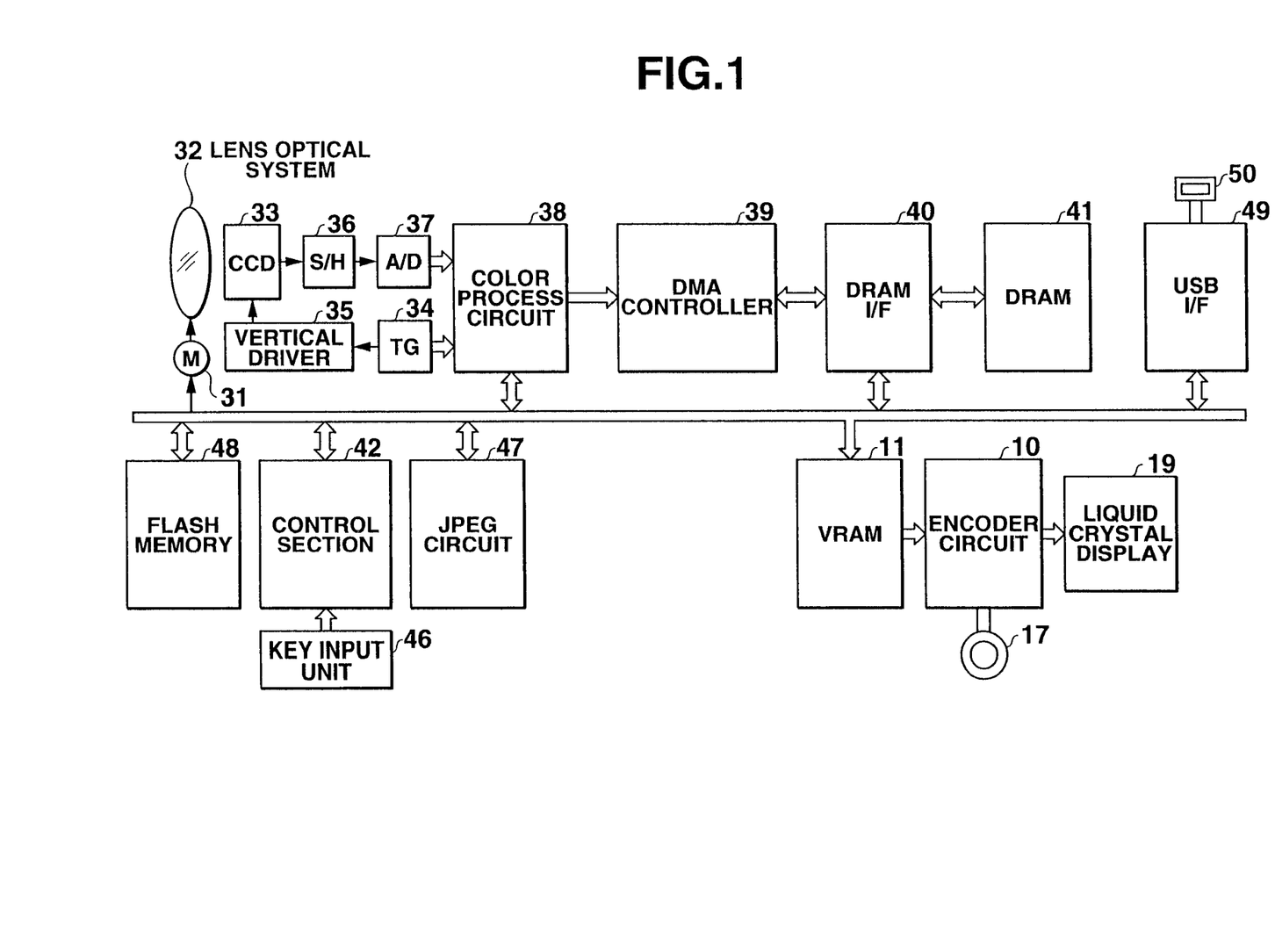
FIG. 1 is a block diagram showing the circuit configuration of the digital camera according to the first embodiment of the present invention.

FIG. 1 shows the constitution of the digital camera and the circuit configuration of the digital camera.

The camera has an optical system 32 including imaging lends. For monitoring with the camera in the imaging mode, focusing and diaphragm positions of the optical system 32 are moved or driven by a motor (M) 31. An imaging element CCD (Charge Coupled Device) 33, positioned behind the optical system 32 and on the optical axis of the optical system 32. The CCD 34 is driven by a timing generator (TG) 34 and a vertical driver 35 for scanning images, and outputs analog image signals of R (Red)-, G (Green)-, and B (Blue)-primary color components of individual pixels which are obtained by photoelectrically converting the focused optical image, frame by frame, at specified time intervals.

The signal levels or gains of the analog image signals of the RGB primary color components output from the CCD 33 are adjusted by an amplifier (not shown). The gain-adjusted image signals are sampled and held by a sample holding (S/H) circuit 36, then converted into digital data by an A/D converter 37. The digital data from the A/D converter 37 is supplied to a color process circuit 38. The color process circuit 38 performs on the received digital data with a color process including pixel interpolation and gamma correction, and then generates a digital luminance signal Y and chrominance difference signals Cb, Cr (YUV signal) and supplies the generated digital signals to a DMA (direct memory access) controller 39. The color process circuit 38 also generates and outputs a composite synchronizing signal, a memory write enable signal, and a clock signal to the DMA controller 39.

The DMA controller 39 once stores the luminance signal Y and the chrominance difference signals Cb, Cr supplied from a color process circuit 38 to an internal buffer in response to the composite synchronizing signal, the memory write enable signal, and the clock signal. The DMA controller 39 transmits the luminance and chrominance difference signals in a DMA transfer mode via a DRAM interface (I/F) 40 to a DRAM 41 serving as a buffer memory.

A controller 42, which comprises a CPU, a ROM storing operation programs to be executed by the CPU, a RAM serving as a working memory, or the like, governs the control of the whole of the digital camera. The controller 42, after the DMA transfer of the luminance and chrominance difference signals to the DRAM 41, reads the luminance and chrominance difference signals (YUV signal) from the DRAM 41 via the DRAM interface 40, and writes the same into a VRAM 11.

An encoder circuit 10 reads the luminance and chrominance difference signals from the VRAM 11 periodically and, based on the thus-obtained data, generates and outputs RGB signals to a liquid crystal display unit 19 and generates video signals for outputting by wire to an external monitor display unit 18, to be discussed later, via a video output terminal 17.

The liquid crystal display unit 19 functions as an electronic finder during the imaging mode. In the imaging mode, the liquid crystal display unit 19 displays a real time image picked up by the CCD 33, based on RGB signals supplied from the encoder circuit 10.

When a shutter key included in a key input unit 46 is operated for taking a still image with a real-time image on the liquid crystal display unit 19, a trigger signal is generated.

In response to the trigger signal, the controller 42, immediately after the DMA transfer to DRAM 41 of the luminance and chrominance difference signals covering the image being picked up by CCD 33, closes the channel from CCD 33 to DRAM 41 and shifts to a record storing mode.

In this record storing mode, the controller 42 reads the luminance and chrominance difference signals for a frame in DRAM 41 via the DRAM interface 40 in the form of 8 vertical pixels×8 horizontal pixels, called a basic block, for each of the Y, Cb, Cr components, and writes them into a JPEG (Joint Photograph coding Experts Group) circuit 47, where they are compressed by ADCT (Adaptive Discrete Cosine Transform), Huffman encoding which is a entropy encoding system, or the like.

The encoded data are read as an image data file from the JPEG circuit 47, and then written into a flash memory 48 which is an nonvolatile memory sealed in a removable memory card attached to the digital camera as a storing medium.

In this process, it is so designed, relative to the image data file to be written into the flash memory 48, that a file name of a specified length, e.g., 03033112340001.jpg, including the date and time of a shutter key operation to be obtained from a clock not illustrated here, and a serial number, be automatically generated and attached to the file for storage.

The file name "03033112340001.jpg" means that it is a 0001st JPEG-compressed still image taken at year: 2003/month: Mar./date: 31/time: 12:34.

The flash memory 48 can be built in the digital camera separate from the removable memory card, or both a memory card and a built-in memory can be used.

The controller 42, upon completion of the compression of the luminance and chrominance difference signals for one frame and the writing of the whole compressed data into the flash memory 48, reactivates the channel from CCD 33 to DRAM 41.

Furthermore, a USB interface (I/F) 49 is connected to the controller 42, and the USB interface controls communication in transmitting/receiving image data or the like to/from an externally installed instrument connected by wire via a USB connector, such as a personal computer.

The key input unit 46 comprises, besides the shutter key, a power source key, a mode key, a zoom key, a menu key, a ring key, a set key, a display key, etc., and signals ensuing from their operation are directly sent to the controller 42.

In the case of moving image picking mode for storing a moving image, the storing of still image data in DRAM 41 is periodically and continuously executed while the shutter key of the key input unit 46 is being operated and, upon discontinuance of the shutter key operation or after the passage of a specified time length, e.g. 30 seconds, the data of the series of still images are sequentially compressed in the JPEG circuit 47, a JPEG moving image data file is generated containing the still images and is stored in the flash memory 48.

In the reproduction mode, the controller 42 selectively reads image data stored in the flash memory 48, the selected image data are expanded in the JPEG circuit 47 in a way quite reverse to the one followed for compression in the imaging mode, the expanded data are held in DRAM 41 after passing through the DRAM interface 40, the contents held in DRAM 41 are memorized by VRAM 11, and image data are periodically read out of VRAM 11 for the generation of RGB signals by the encoder circuit 10 for display on the liquid crystal display unit 19. This means that, in case the external monitor display unit 18 is connected by wire via the video output terminal 17, the video signals generated by the encoder circuit 10 are outputted to the monitor display unit 18.

In case the selected image data are not a still image but a moving image, the reproduction of individual still image data constituting the selected data file is periodically and continuously executed in terms of time and, at the time when reproduction of all the still image data is over, only the still image data positioned at the head of the moving image data is reproduced, which stays so until a next reproduction instruction is given.

Figure 2:
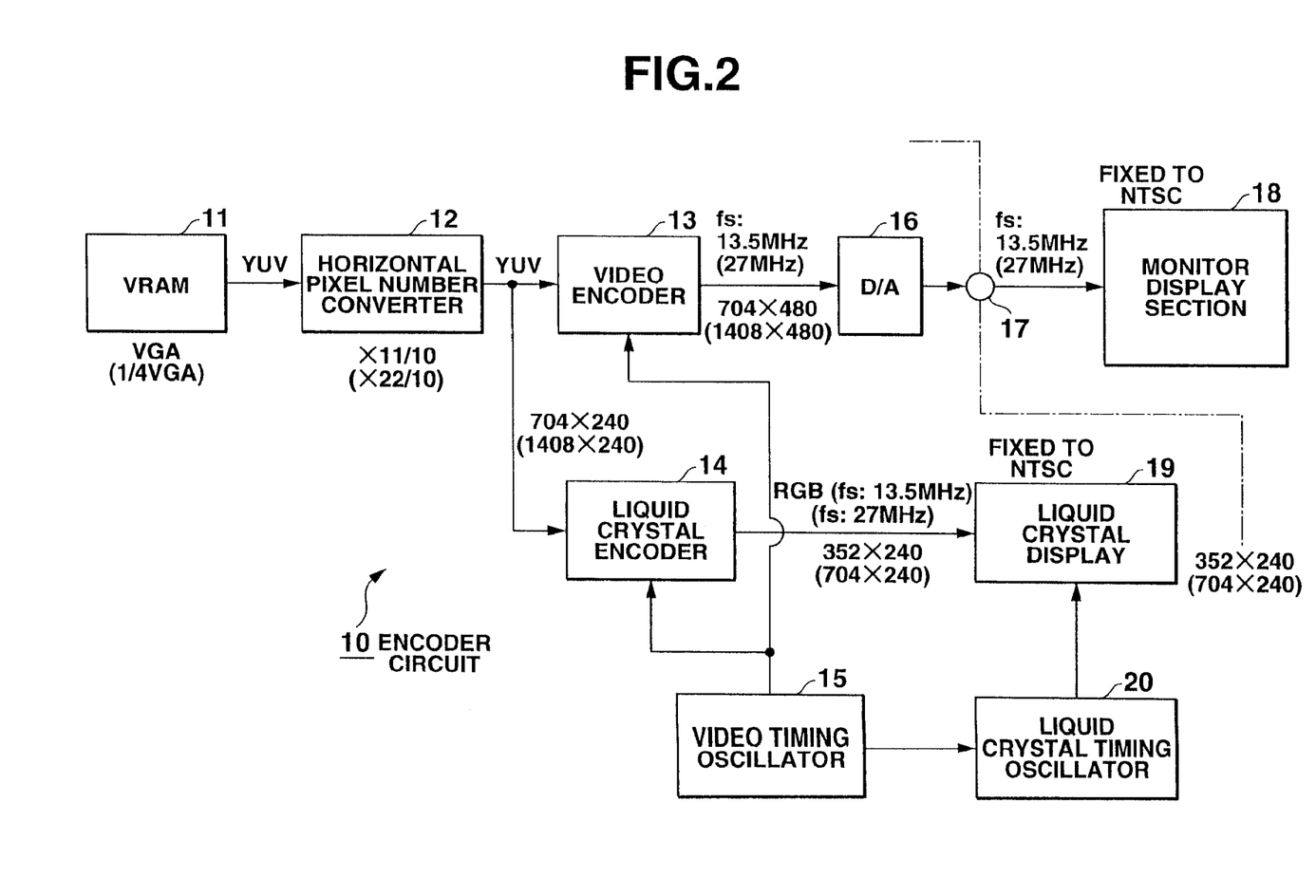
FIG. 2 is a block diagram showing the configuration of the encoder circuit according to the first embodiment of the present invention.

FIG. 2 shows the configuration of the encoder circuit 10 involved in the output signal generation unit for the display panel.

Since the size of the liquid crystal display panel in this embodiment is about 1-2 inches in diagonal and the number of pixels on the liquid crystal panel is accordingly small, the pixels constituting images based on VGA, NTSC (National Television Systems Committee) or like other specifications needs to be appropriately thinned out.

In FIG. 2, for the implementing a through image display (a real-time display of image picked up by the CCD 33) for monitoring during the imaging mode, digital image data of the luminance/chrominance system (YUV data) for instance a VGA-based 480 vertical pixels×640 horizontal pixels configuration are sequentially memorized in the VRAM 11 and then read by a horizontal pixel number converter 12.

The horizontal pixel number converter 12 performs correlation operation or interpolation to increase the number of pixels to the number multiplied by 11/10 of the number of pixels in each horizontal line of the digital image data for correspondence with the horizontal scanning cycle of the NTSC system in use in Japan.

The horizontal pixel number converter 12, in addition, outputs two sheets (fields) of image data, one sheet (field) is an odd number line sheet (field) constituted by image data of the odd number horizontal scanning lines and the other sheet (field) is an even number line sheet (field) constituted by image data of the even number horizontal scanning lines, for compliance with NTSC interlacing.

The horizontal pixel number converter 12, accordingly, outputs digital image data in a 240 vertical pixels×704 horizontal pixels configuration of the luminance/chrominance system (YUV) to a video encoder 13 and a liquid crystal encoder 14 at a cycle of 1/60 seconds.

The video encoder 13 and the liquid crystal encoder 14 operate in response to a standard clock supplied from a video timing oscillator 15.

The video encoder 13 prepares digital NTSC video signals by sampling, at 13.5 MHz, the digital image data received from the horizontal pixel number converter 12, and supplies the digital NTSC video signals to the D/A converter 16. The D/A converter 16 converts the digital NTSC video signal to analog NTSC video signal and externally outputs the analog NTSC signals via the video output terminal 17.

When the NTSC based monitor display unit 18 such as a CRT TV receiver or a liquid crystal display TV receiver is connected to the video output terminal 17 through a cord (not illustrated), the monitor display unit 18 puts the obtained image data on the panel.

The liquid crystal encoder 14, based on the digital image data of the luminance/chrominance system from the horizontal pixel number converter 12, generates primary color (RGB) digital image data thinned out, by sampling at 13.5 MHz, to a 240 scanning electrodes×352 signal electrodes (horizontal pixels) configuration for a liquid crystal panel to be discussed later, and directly outputs the data to the liquid crystal display unit 19.

The liquid crystal display unit 19, which comprises a TFT (Thin Film Transistor) liquid crystal panel having an NTSC based 240 scanning electrodes×352 signal electrodes configuration and a driving circuit therefore, uses the primary color digital image data, directly transmitted from the liquid crystal encoder 14, for the execution of an image display in response to various timing signals for the liquid crystal display generated by the liquid crystal timing oscillation unit 20 based on the standard clock generated by the video timing oscillator 15.

The operation of a circuit configured as such is explained below.

Figure 3A:
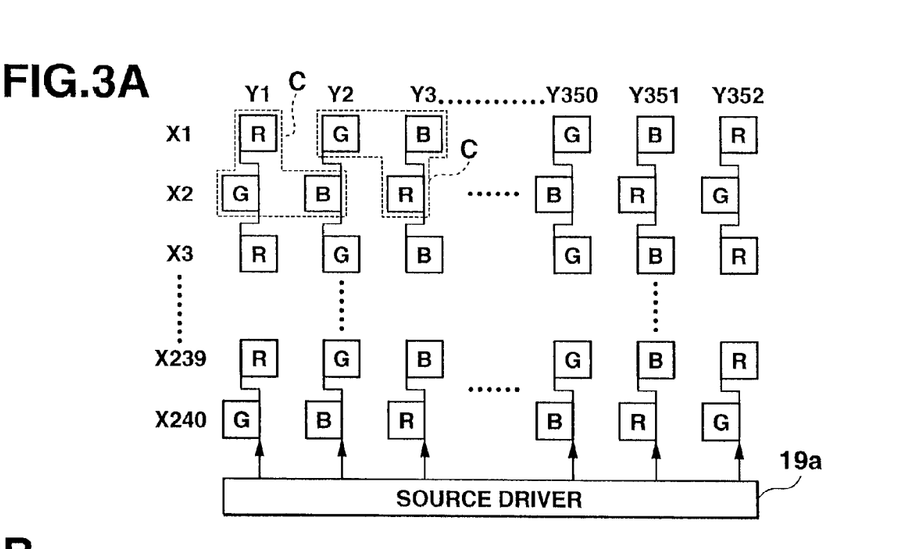
FIGS. 3A and 3B are diagrams showing correspondence between the liquid crystal panel pixel configuration and the display data according to the first embodiment of the present invention.

At first, it is assumed that the electrode and pixel arrangements in the liquid crystal panel constituting the liquid crystal display unit 19 are as shown in FIG. 3A. In this case, X1 to X240 are drain (scanning) electrodes driven for scanning by a drain driver, not illustrated, and Y1 to Y352 are source (signal) electrodes driven for displaying by a source driver 19a according to the digital image data.

In this case, each of the R, G, B dots (color elements), neighboring each other in the vertical direction and connected to the same signal electrode driven by the source driver 19a, is displaced from each other by half a dot.

In addition, it is assumed that an arrangement, widely used in the name of a "delta array," is provided, wherein three R, G, B dots constituting an pixel (or an image string) C indicated by a broken line in FIG. 3A form a triangle that spans two lines.

Figure 3B:
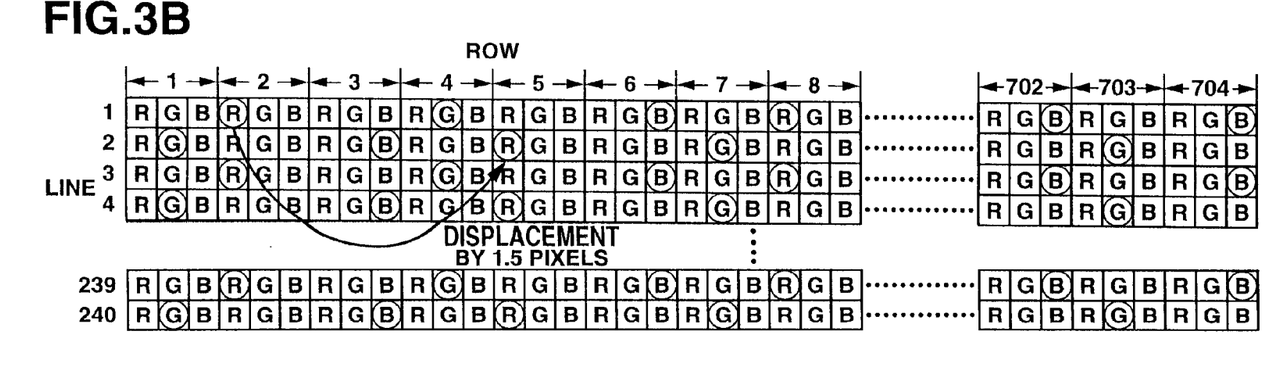

It is assumed that the data from the horizontal pixel number converter 12 into the liquid crystal encoder 14 are increased in the number of pixels in the horizontal direction and have a luminance/chrominance system based an image of a 240 vertical pixels×704 horizontal pixels configuration and that image data as shown in FIG. 3B are obtained after encoding the configuration into primary color digital image data of the same pixel configuration.

In this way, in case a delta array is employed in the liquid crystal display panel and the number of signal electrodes is half the horizontal pixel number of the image data input into the liquid crystal encoder 14, the liquid crystal encoder 14 generates primary color digital image data wherein elements of the same color neighboring each other in the horizontal direction in two corresponding lines are thinned out (by sampling) to be displaced from each other by 1.5 pixels, and the generated data are outputted directly to the liquid crystal display unit 19. In FIG. 3B, the color components of the actually selected pixels are shown encircled.

For instance, it is assumed that, in two lines corresponding to signal electrodes X1 and X2 in the liquid crystal panel, image data are obtained, described by a dot R (X1, Y1) and another dot R (X2, Y3) as neighboring dots of the same color component.

The dot R (X1, Y1) is displaced by a half dot to the right side from the dot G (X2, Y1) of the electrode of the same signal. In addition, since the number of all the signal electrodes is half the number of the horizontal pixels of the image data to be inputted into the liquid crystal encoder 14 and since it is necessary to read data of a one-dot color component from two pixels neighboring each other in the horizontal direction in the image data, the R component in the right side even number 2 in image data is selected as encircled, out of the two image string data of line number 1 and column numbers 1 and 2 in the digital image indicated in FIG. 3B, and then displayed as a dot R (X1, Y1) in the liquid crystal panel.

Similarly, as the data described by a dot R (X2, Y3) in the liquid crystal panel, the R component in the image data of line number 2, column number 5 is selected, as encircled.

In this way, when it is taken into consideration that a pixel is selected from two image data pixels neighboring each other in the horizontal direction in FIG. 3B and that the color component of the corresponding dot is selected in view of the delta array, it is inferred that the liquid crystal encoder 14 generates its result by selecting primary color digital image data pixels so that the elements of the same color horizontally neighboring each other in the corresponding two lines may be displaced from each other by 1.5 pixels.

Accordingly, since the liquid crystal encoder 14 outputs RGB signals after appropriately selecting pixel data for display on the widely used delta-arranged liquid crystal panel, the displayed image data are free of local distortions, and are quite natural, compared with the supplied data.

Moreover, as described above, the liquid crystal display unit 19 is constituted of a liquid crystal panel wherein the number of signal electrodes (with the number of signal electrodes being half the number of pixels in the horizontal direction in the video signal) is based on the number of horizontal pixels in the video signal of the NTSC system used in the video signal system after the video encoder 13. VRAM 11 having a VGA-based image string configuration is used, the number of pixels in the horizontal direction is uniformly converted by the horizontal pixel number converter 12 into a number of pixels in the horizontal direction of the NTSC system video signal, and then the result is divided into two signal systems of the video encoder 13 and the liquid crystal encoder 14.

In this way, the circuit is realized by using only one VRAM 11 which is a video memory of an ordinary constitution, and this reduces to the maximum extent the size of the encoder circuit as a whole.

In addition, digital image data generated by the liquid crystal encoder 14 are directly outputted to the liquid crystal display unit 19 for a display without conversion into analog data, and this dispenses with a D/A converter or a macro circuit for a further reduction in the encoder dimensions.

The numbers are not limited to the image data constituting pixel numbers explained in FIG. 2, FIG. 3A, or FIG. 3B, and they can be also numbers in parentheses in FIG. 1 or be other numbers.

Also, digital image data of the luminance/chrominance system whose number of horizontal pixels is the same as the number of liquid crystal panel signal electrodes may be inputted into the liquid crystal encoder 14 for generating new pixels, displaced by 1.5 pixels, by interpolation in the liquid crystal encoder 14 for display on the liquid crystal display unit 19.

In case the liquid crystal panel of the liquid crystal display unit 19 has no delta array of pixels, digital image data of the luminance/chrominance system whose number of horizontal pixels is the same as the number of liquid crystal panel signal electrodes are inputted into the liquid crystal encoder 14 for conversion into primary color data of the same pixel number, and the purpose is achieved when the corresponding color component in the converted pixel is selectively read, this simplifying the constitution of the liquid crystal encoder 14.

In case the monitor display unit 18 is compatible with digital input (digital broadcasting), it is necessary to dispense with the D/A converter 16 to enable the output of digital video signals.

The Second Embodiment

The second embodiment wherein the invention is applied to the encoder circuit of a digital camera is explained, with reference made to drawings.

Figure 4:
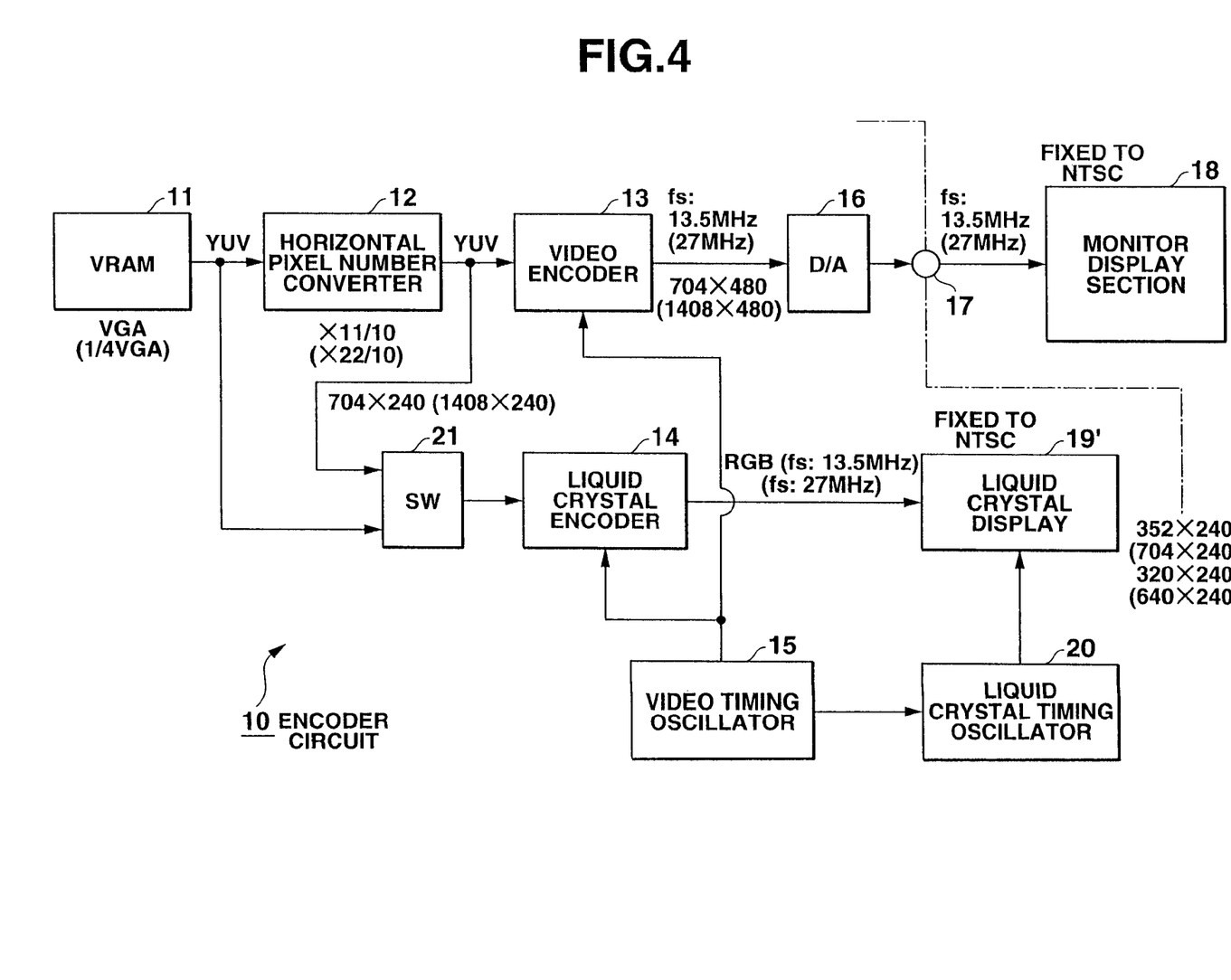
FIG. 4 is a block diagram showing the configuration of the encoder circuit according to the second embodiment of the present invention.

The configuration of the encoder circuit shown in FIG. 4 is basically equal to the constitution shown in FIG. 2, and then the same symbols are given to the parts the same as those in FIG. 2 for dispensing with the need of explanation.

In the encoder circuit 10, both image data outputted by VRAM 11 with the pixel number in the horizontal direction not converted and image data with the pixel number in the horizontal direction converted by the horizontal pixel number converter 12 are first put into a switch circuit (sw) 21, and then the contents of either of the two are selected for the liquid crystal encoder 14.

Now, not only a panel having a signal electrode number (equal to or half the pixel number in the video signal horizontal direction) based on the NTSC video signal horizontal pixel number but also a widely used VGA based panel having a 240 vertical electrodes×320 horizontal electrodes or 240 vertical electrodes×640 horizontal electrodes configuration may be selected for use as the liquid crystal panel of the liquid crystal display unit 19'.

Accordingly, whatever is used for the liquid crystal panel for the liquid crystal display unit 19', that is, one based on the horizontal pixel number of a video signal or one having signal electrodes whose number is based on VGA, the switching circuit 21 may be set by the manufacturer before shipping the digital camera, for instance, and this enables the encoder circuit 10 to deal with both cases for the enhancement of the general purpose feature of the circuit.

The Third Embodiment

The third embodiment wherein the invention is applied to the encoder circuit of a digital camera is explained, with reference to drawings.

Since the liquid crystal panel used in this embodiment is about 1-2 inches in a diagonal and its number of pixels proper for the size, the number of pixels for images of VGA, NTSC, PAL (Phase Alternating Line), etc., should be appropriately thinned out for driving the display.

Figure 5:
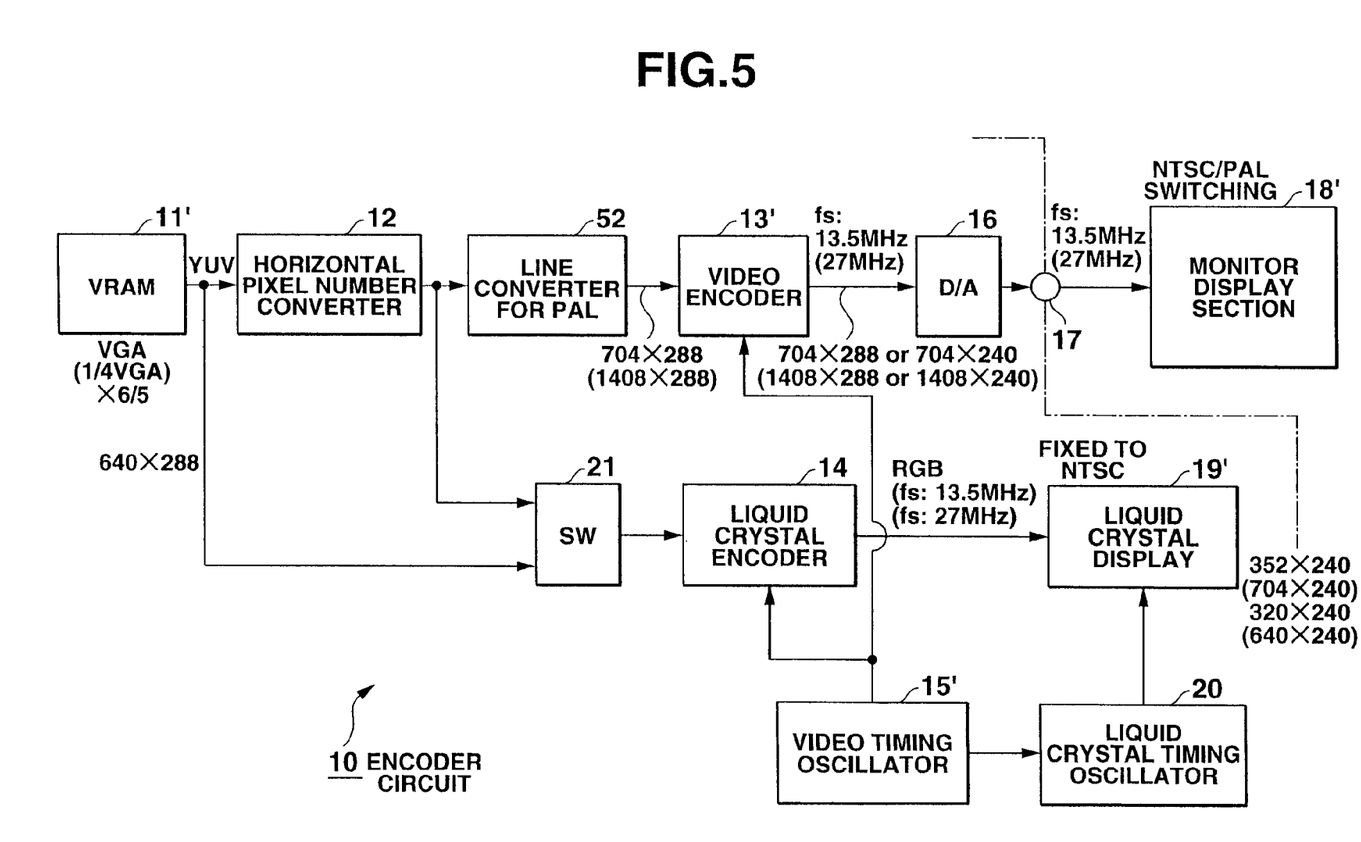
FIG. 5 is a block diagram showing the configuration of the encoder circuit according to the third embodiment of the present invention.

In this embodiment, in view of the fact that digital cameras are sold and used not only in Japan but also in Europe, Oceania, etc., the encoder is enabled to connect to an externally provided monitor display unit 18' for PAL in addition to a unit 18' for NTSC.

Incidentally, the video signal circuit is almost common between NTSC and PAL whose video signal horizontal scanning cycles are approximately the same though the number of scan lines is different between the two (20% more in PAL than in NTSC).

The configuration of the encoder circuit 10 shown in FIG. 5 is basically equal to the configuration shown in FIG. 4, and then the same symbols are given to the parts the same as those in FIG. 4 for dispensing with the need of explanation.

In this encoder circuit 10, the VRAM 11', which memorizes and outputs digital image data of the luminance/chrominance system, multiplies the number of lines by 6/5 to be compatible with both NTSC and PAL and, to achieve the purpose, reads every fifth line twice.

Accordingly, the line numbers of the digital image data to be read from the VRAM 11' will be 1, 2, 3, 4, 5, 5, 6, 7, 8, 9, 10, 10, etc.

A line converter 52 is provided for PAL in between the horizontal pixel number converter 12 and a video encoder 13'.

The line converter 52 outputs without any processing the digital image data received from the horizontal pixel converter 12 in case the monitor display unit 18' that is to connect to the video output terminal 17 is of the NTSC system and, in case it is of the PAL system, a correlational calculation is conducted for the vertical direction so that image data for five lines may be uniformly interpolated for six lines.

It can be so designed that whether or not the PAL oriented line converter 52 performs line conversion can be determined by the digital camera user's operating a selector switch according to the television system of the monitor display unit 18' which the user connects to the video output terminal 17.

The behavior of such a circuit as mentioned above, where the connected monitor display unit 18' is of the NTSC system, is similar to that in the first embodiment, with the PAL oriented line converter 52, situated in between the horizontal pixel number converter 12 and the video encoder 13', merely letting through digital image data.

In this case, both the video encoder 13' and the liquid crystal encoder 14 output digital image data with the scanning line number back to NTSC by stop encoding the image data on every sixth line whose contents are the same as those of the preceding line.

With the monitor display unit 18' connected for PAL to the video output terminal 17, the line converter 52 for PAL comes into operation in the video signal system, performing a correlational calculation, as mentioned above, for the digital image data of the luminance/chrominance system with some lines overlapping one upon another.

Based on the digital image data after the correlational calculation, the video encoder 13' generates digital video signals according to the standard clock received from the video timing oscillator 15' with the frequency appropriately increased, and the product is converted into analog signals in the D/A converter 16 and outputted to the monitor display unit 18' for the display of a PAL image.

In the liquid crystal encoder 14, either input into or output from the horizontal pixel number converter 12 is selected by the switching circuit 21 according to the number of signal electrodes of the liquid crystal display unit 19', encoding is disabled of the image data on every sixth line whose contents overlap those of the preceding line, as in the above-mentioned case where the monitor display unit 18' connected to the encoder 14 is of the NTSC system, and primary color digital image data with the number of scanning lines returned to that of the NTSC system are generated and outputted to the liquid crystal display unit 19.

That the monitor display unit 18' connecting the video output terminal 17 is thus enabled to deal with two systems, e.g., NTSC and PAL, further enhances, in collaboration with the merits of the above-mentioned first embodiment, the general purpose feature of the circuit.

The Fourth Embodiment

The fourth embodiment wherein the invention is applied to the encoder circuit of a digital camera is explained, with reference made to drawings.

Since the liquid crystal panel used in this embodiment is but 1-2 inches in diagonal and its number of pixels proper for the size, the number of pixels for images for VGA, NTSC, etc., should be appropriately thinned out for driving the display.

Figure 6:
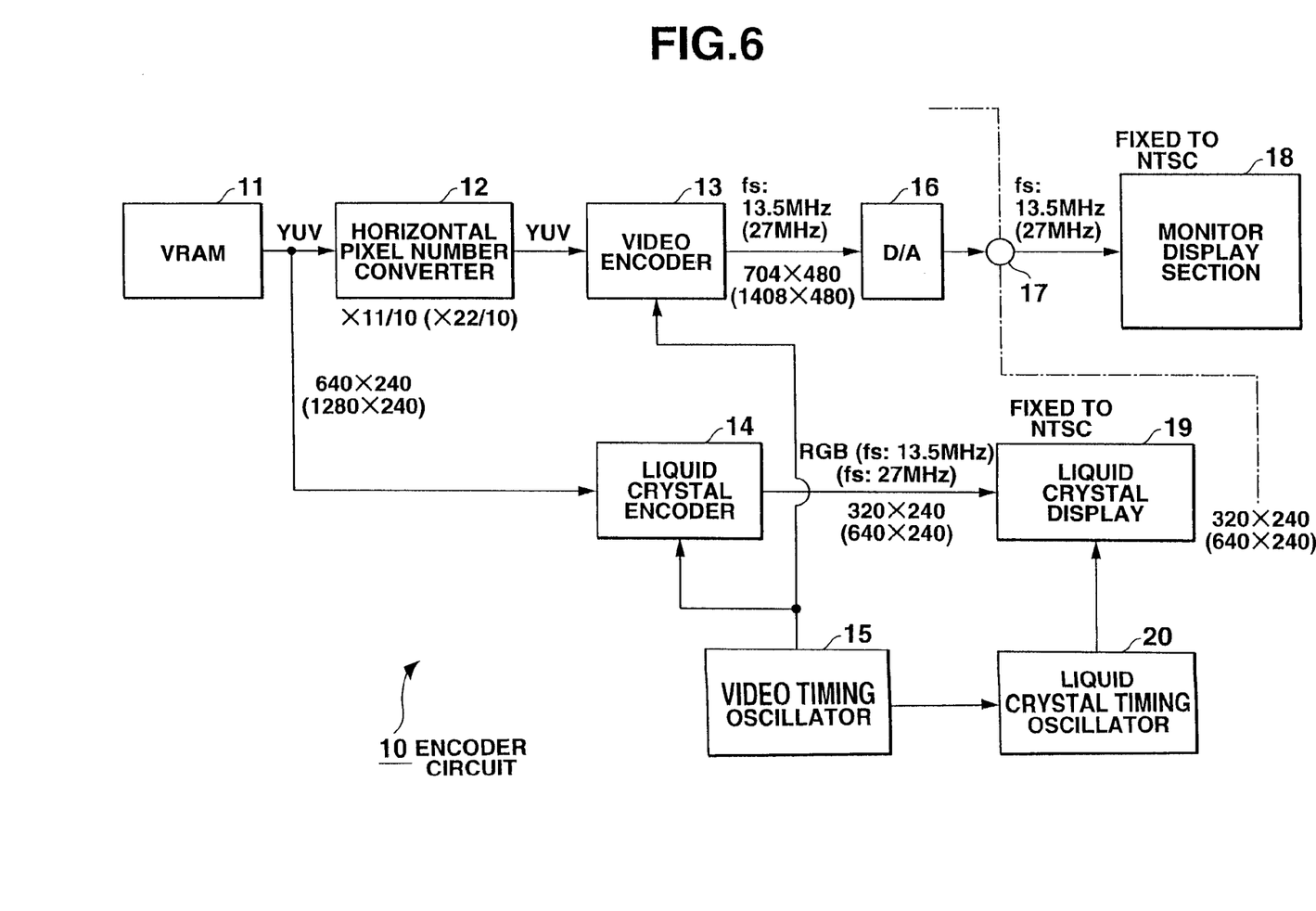
FIG. 6 is a block diagram showing the configuration of the encoder circuit according to the fourth embodiment of the present invention.

The configuration of the encoder circuit 10 shown in FIG. 6 is basically equal to the constitution shown in FIG. 1, and then the same symbols are given to the parts the same as those in FIG. 1 for dispensing with the need of explanations.

Digital image data of the luminance/chrominance system based on VGA, outputted by VRAM 11 at the first stage of the horizontal pixel number converter 12 with the horizontal pixel number not converted for video signals, are directly inputted into the liquid crystal encoder 14.

The liquid crystal encoder 14 generates primary color (RGB) digital image data, based on the digital image data of the luminance/chrominance system, thinned out to 240 scanning electrodes×320 signal electrodes for the liquid crystal panel to be discussed later, and outputs them directly to the liquid crystal display unit 19.

The liquid crystal unit 19, constituted of a TFT liquid crystal panel having a VGA-based 240 scanning electrodes 240×320 signal electrodes configuration and a driving circuit for the panel as described above, executes an image display by using the primary color digital image data directly received from the liquid crystal encoder 14.

The operation of a circuit configured as such is explained below.

The numbers of electrodes of the liquid crystal panel constituting the liquid crystal display unit 19 are based on widely used VGA, as described above, and, accordingly, the liquid crystal encoder 14 directly drives the widely used liquid crystal display panel by using the digital image data.

On the other hand, since only one video memory, which is VGA-based VRAM 11, is used and video signals are fabricated in the video encoder 13 after horizontal pixel conversion for video signals in the horizontal pixel number converter 12, the scale of the encoder circuit is reduced in the maximum degree without an unnecessary increase in the number of video memories.

The Fifth Embodiment

The fifth embodiment wherein the invention is applied to the encoder circuit of a digital camera is explained, with reference made to drawings.

Since the liquid crystal panel used in this embodiment is but 1-2 inches in diagonal and its number of pixels proper for the size, the number of pixels for images of VGA, NTSC, etc., should be appropriately thinned out for driving the display.

Figure 7:
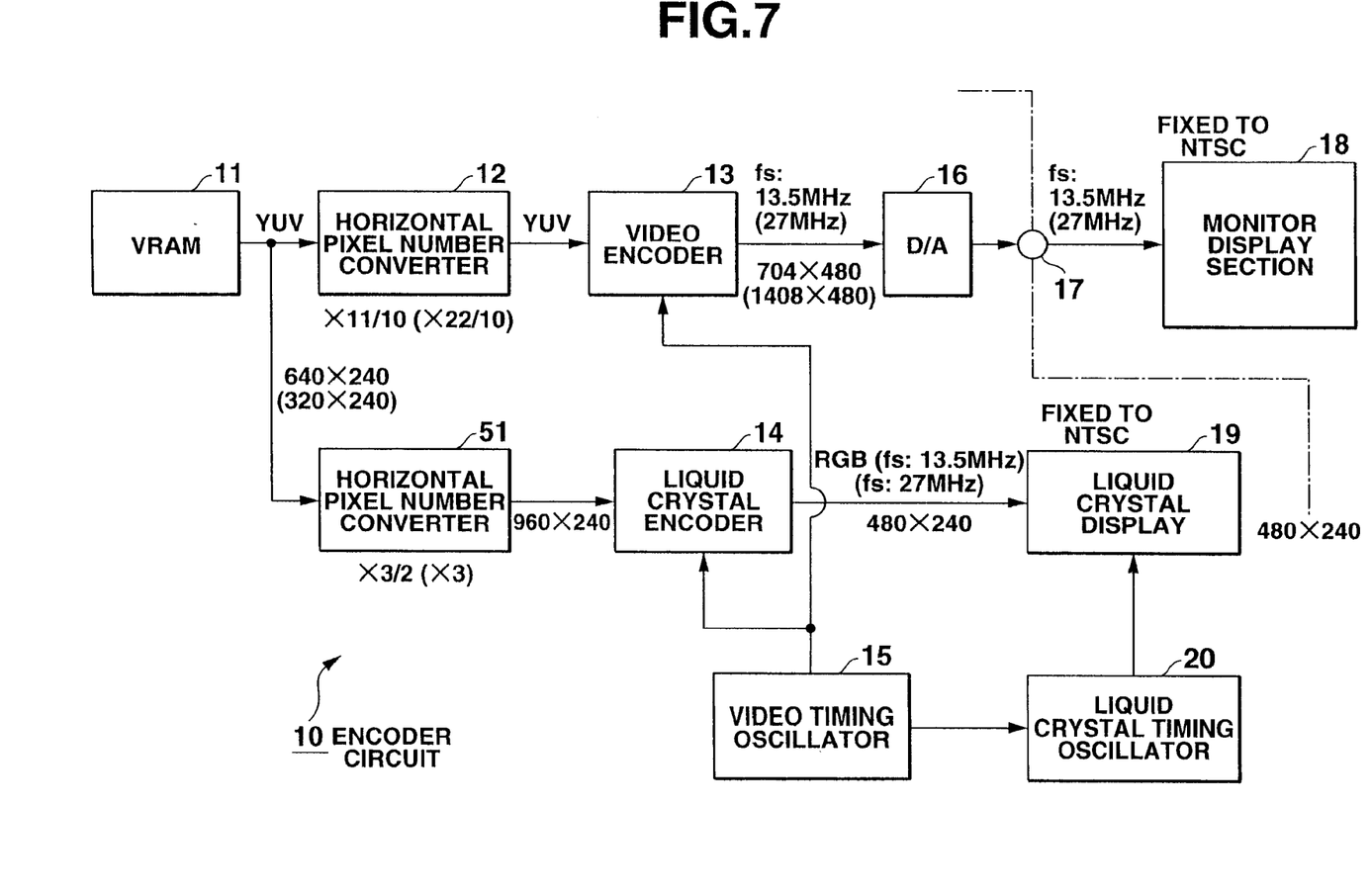
FIG. 7 is a block diagram showing the configuration of the encoder circuit according to the fifth embodiment of the present invention.

The configuration of the encoder circuit 10 shown in FIG. 7 is basically equal to the constitution shown in FIG. 6, and then the same symbols are given to the parts the same as those in FIG. 6 for dispensing with the need of explanation.

Digital image data of the luminance/chrominance system based on VGA, outputted by VRAM 11 at the first stage of the horizontal pixel number converter 12 with the horizontal pixel number not converted for video signals, are inputted into a horizontal pixel number converter 51.

The horizontal pixel number converter 51 performs conversion through a correlational calculation (interpolation) for the multiplication by 3/2 (or 3) of the number of pixels constituting each horizontal line in the digital image data.

Digital image data with the number of horizontal pixels converted into 960 in the horizontal pixel number converter 51 are inputted into the liquid crystal encoder 14.

The liquid crystal encoder 14 generates primary color (RGB) digital image data, based on the digital image data of the luminance/chrominance system, thinned out to 240 scanning electrodes×480 signal electrodes for the liquid crystal panel to be discussed later, and outputs them directly to the liquid crystal display unit 19.

The liquid crystal unit 19, constituted of a TFT liquid crystal panel having a VGA-based 240 scanning electrodes× 480 signal electrodes configuration and a driving circuit for the panel as described above, executes an image display by using the primary color digital image data directly received from the liquid crystal encoder 14.

Accordingly, since only one video memory, which is VRAM 11 again based on VGA, is used and video signals are fabricated in the video encoder 13 after horizontal pixel conversion for video signals in the horizontal pixel number converter 12, the scale of the encoder circuit is reduced in the maximum degree without unnecessary increase in the number of video memories.

In FIG. 7, the liquid crystal panel has 480 signal electrodes and the multiplication factor of the horizontal pixel number converter 51 is 3/2 (in case of 640 pixels) or 3 (in case of 320 pixels), which does not exclude an encoder circuit application to other configurations.

For instance, provided that image data having 320 horizontal pixels are memorized in VRAM 11, combinations are feasible wherein the multiplication factor of the horizontal pixel number converter 51 may be 11/10, 2, 2×11/10, 9/8, 6/5, 5/4/, 3, or 3×11/10, and the number of signal electrodes in the liquid crystal panel may be 352, 640, 704, 360, 384, 400, 960, or 1,056.

It may be so designed also that digital image data of the luminance/chrominance system having horizontal pixels the same in number as the signal electrodes in the liquid crystal panel are inputted into the liquid crystal encoder 14, that pixels displaced by 1.5 pixels are newly fabricated by interpolation in the liquid crystal encoder 14, and that they are outputted to the liquid crystal display unit 19.

Moreover, in case where the liquid crystal panel of the liquid crystal display unit 19 does not have a delta-array pixel configuration, digital image data of the luminance/chrominance system having horizontal pixels the same in number as the signal electrodes in the liquid crystal panel are generated in the horizontal pixel number converter 51 and inputted into the liquid crystal encoder 14, and the liquid crystal encoder 14 deals with the data by simply converting them into primary color data of the same pixel number and by merely selecting and reading the corresponding color components in the converted pixels, and this further simplifies the constitution of the liquid crystal encoder 14.

In case the monitor display unit 18 is compatible with a digital input (digital broadcasting), the D/A converter 16 needs be omitted so that digital video signals are outputted.

The Sixth Embodiment

The sixth embodiment wherein the invention is applied to the encoder circuit of a digital camera is explained, with reference made to drawings.

Figure 8:
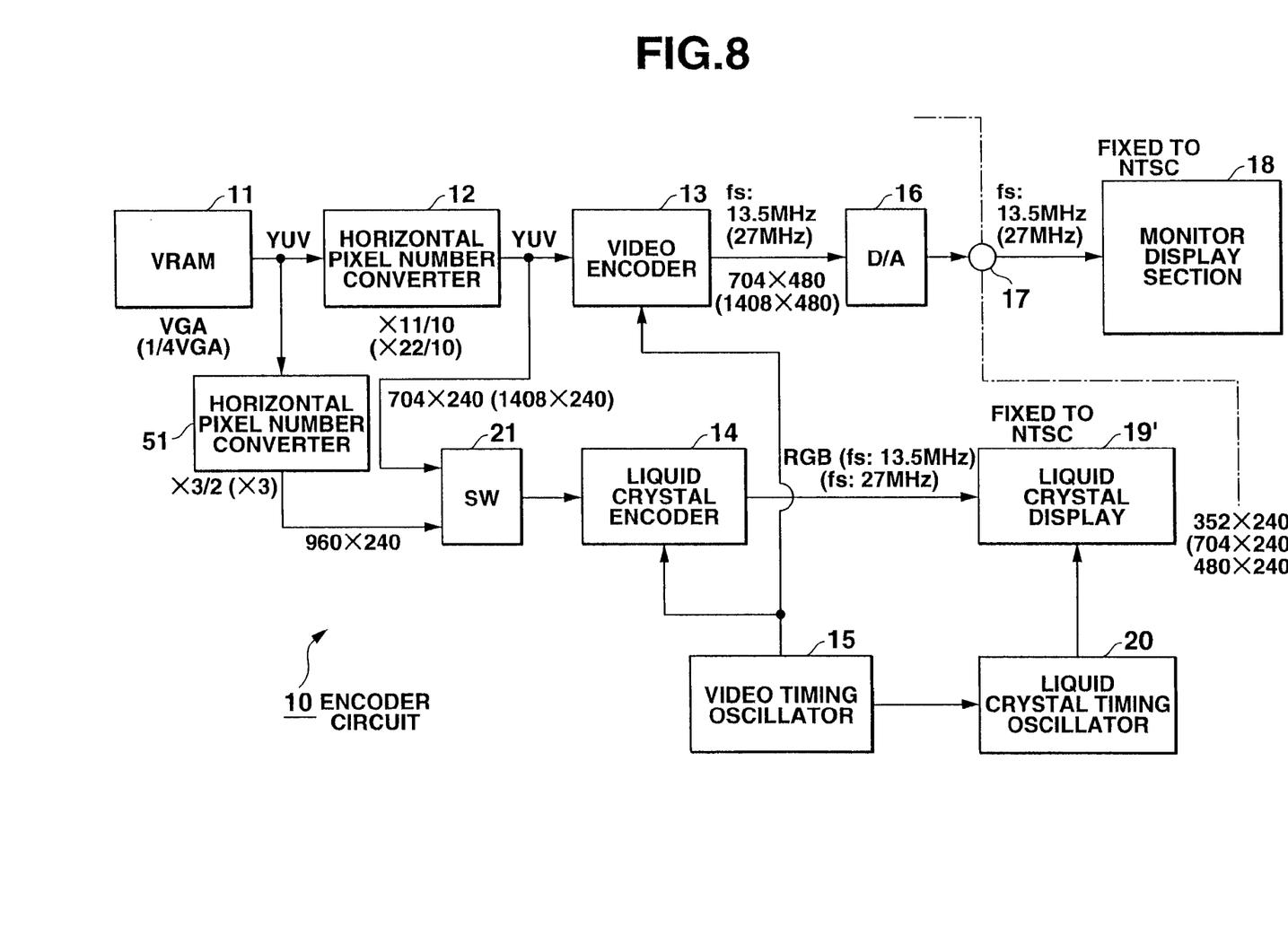
FIG. 8 is a block diagram showing the configuration of the encoder circuit according to the sixth embodiment of the invention.

The configuration of the encoder circuit shown in FIG. 8 is basically equal to the constitution shown in FIG. 4 or FIG. 7, and then the same symbols are given to the parts the same as those in FIG. 4 or FIG. 7 for dispensing with the need of explanations.

Digital image data of the luminance/chrominance system based on VGA, outputted by VRAM 11 at the first stage of the horizontal pixel number converter 12 with the horizontal pixel number not converted for video signals, are inputted into the horizontal pixel number converter 51.

The horizontal pixel number converter 51 performs conversion through a correlational calculation (interpolation) for the multiplication by 3/2 (or 3) of the number of pixels constituting each horizontal line in the digital image data.

Digital image data with the number of horizontal pixels converted into 960 in the horizontal pixel number converter 51 and image data with the horizontal pixel number converted in the horizontal pixel number converter 12 are first inputted into the switching circuit (SW) 21, and then the contents of only one of the two are selected for transmission into the liquid crystal encoder 14.

Now, not only a panel having a signal electrode number (equal to or half the pixel number in the video signal horizontal direction) based on the NTSC video signal horizontal pixel number but also a widely used VGA based panel having a 240 vertical electrodes×480 horizontal electrodes configuration may be selected for use as the liquid crystal panel of the liquid crystal display unit 19'.

Accordingly, whatever is used for the liquid crystal panel for the liquid crystal display unit 19', that is, one based on the horizontal pixel number of a video signal or one having signal electrodes whose number is based on VGA, the switching circuit 21 may be set by the manufacturer before shipping the digital camera, for instance, and this enables the encoder circuit 10 to deal with both cases for the enhancement of the general purpose feature of the circuit.

Furthermore, the invention applies to various types of VGA-based liquid crystal panels having different numbers of signal electrodes when the multiplication factor of the horizontal pixel number converter 51 is appropriately changed. Provided that image data having 320 horizontal pixels are stored in VRAM 11 and that the multiplication factor of the horizontal pixel converter 51 is set, for instance, at 11/10, 2, 2×11/10, 9/8, 6/5, 5/4, 3, or 3×11/10, the invention can deal with liquid crystal panels having 352, 640, 704, 360, 384, 400, 960, or 1,056 signal electrodes (horizontal pixels), respectively.

In the second, the third, and the seventh embodiments above, constitutions are simultaneously capable of outputting RGB signals for the digital image data monitor display unit 18 and of outputting video signals for the liquid crystal display units 19, 19' are explained. In case the selective output of only one of the two is sufficient, the probable constitution is to be similar to the encoder circuit 10 explained in the first embodiment (FIG. 2), wherein the multiplication factor for conversion by the horizontal pixel number converter 12 is appropriately changed for outputting RGB signals or video signals. Such a constitution further reduces the dimensions of the encoder circuit.

In the first through sixth embodiments explained above, only one color, encircled in FIG. 3B, per pixel is selected in the RGB digital image data to be outputted from the liquid crystal encoder 14 to the liquid crystal display units 19, 19' and, provided that the number of gradations per color component is n bits, there is no need of transfer in the parallel value of 3 (colors)×n (bits) per pixel, which is required in the circuit system upstream the liquid crystal encoder 14.

For this reason, a circuit of n-bit wide serial transfer can be realized, whereby the number of signal lines between the liquid crystal encoder 14 and the liquid crystal display units 19, 19' is decreased for a further reduction in the scale of the circuit as mounted.

As for the PAL oriented line converter 52 of FIG. 5 in the explanation of the third embodiment, it can be positioned at the first stage of the video encoder 13 in FIG. 1 of the first embodiment or at the first stage of the video encoder 13 in FIG. 6 of the fourth embodiment. In any case, as stated in the explanation of the third embodiment, the invention serves the purpose whether the monitor display unit 18' connected to the video output terminal 17 is of the PAL system or of the NTSC system.

The first through the sixth embodiments described above explain the application of the invention to the encoder circuits of liquid crystal panels, which does not mean to limit the scope for the application of the invention. The invention can be also applied to encoder circuits of other kinds of display panels, such as electroluminescent panels.

The first through the sixth embodiments described above explain the application of the invention to the encoder circuits of digital cameras, which does not mean to limit the scope for application of the invention. The invention can be also applied to encoder circuits of devices outputting video signals while using primary color digital image data for a display on liquid crystal panels, such as a liquid crystal television receiver provided with a video output terminal.

The first through the sixth embodiments described above explain the application of the invention to digital cameras. The invention can be also applied to any device having an imaging function equipped with a display of any kind, such as a video movie camera, a portable telephone terminal having a camera function, PDA (Personal Digital Assistant), a personal computer, and a television receiver.

The first through the sixth embodiments described above explain the application of the invention to devices equipped with an imaging function. The invention can be also applied to any device not equipped with a camera function but equipped with a display unit, such as a portable telephone terminal, PDA, a personal computer, and a television receiver.

In addition, though digital image data held in the form of YUV signals are converted into digital image data in the form of RGB signals in the liquid crystal encoder 14 and then into video signals in video encoders 13, 13' in the first through sixth embodiment, another circuit configuration can be also realized easily, wherein digital image data held in the form of RGB signals from the beginning are outputted to liquid crystal display units 19, 19' without encoding and are converted into video signals in a video encoder.

It is stated that the application of the invention is not limited to the embodiments described above and that it can be implemented in various forms within the framework of the substance.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an embodiment of the claims of the invention and within the claims are to be regarded to be in the scope of the present invention.

This application is based on Japanese Patent Application No. 2002-340951 filed on Nov. 25, 2002 and Japanese Patent Application No. 2003-324659 filed on Sep. 17, 2003 and including specification, claims, drawings and summary. The disclosure of the above Japanese patent applications is incorporated herein by reference in its entirety.

The invention claimed is:

1. An image signal generation circuit comprising:
 a display panel in which RGB dots of one color are horizontally shifted by 1.5 pixels in two adjacent lines from an initial pixel configuration represented by color components;
 a first horizontal pixel number conversion means for converting a horizontal pixel number of image data of a luminance/chrominance system to a horizontal pixel number suitable for generation of video signals for a specific television system; and
 a first image signal generation means for generating, from the image data of the luminance/chrominance system whose horizontal pixel number has been converted by the first horizontal pixel number conversion means, an RGB signal suitable to be output to the display panel,
 wherein the first horizontal pixel number conversion means comprises:
  (i) an RGB signal generation means for generating an RGB signal from the image data of the luminance/chrominance system whose horizontal pixel number has been converted; and
  (ii) a color component selection means for selecting one color component data from each odd number pixel in a first line of the RGB signal, selecting one color component data from each even number pixel in a second line of the RGB signal adjacent to the first line thereof, and converting the number of horizontal pixels of the RGB signal to the number of horizontal pixels suitable for display on the display panel; and
 wherein the color component selection means selects color component data from the RGB signal so that the selected data form a color component arrangement identical to that of RGB dots on the display panel, and the color component selection means selects color component data of one color so that the color component data of the selected one color in the first line of the RGB signal are shifted horizontally by three pixels from the second line of the RGB signal that is adjacent to the first line thereof.

2. The image signal generation circuit according to claim 1, further comprising:
 an external output terminal; and
 a second image signal generation means for generating, from the image data of the luminance/chrominance system whose horizontal pixel number has been converted by the first horizontal pixel number conversion means, a video signal suitable to be output to the external output terminal.

3. The image signal generation circuit according to claim 1, wherein the specific television system is an NTSC system.

4. An image signal generation method comprising: shifting RGB dots of one color horizontally by 1.5 pixels in two adjacent lines of a display panel from an initial pixel configuration represented by color components;
 converting a horizontal pixel number of image data of a luminance/chrominance system to a horizontal pixel number suitable for generation of video signals for a specific television system; and
 generating, from the image data of the luminance/chrominance system whose horizontal pixel number has been converted, an RGB signal suitable to be output to the display panel
 wherein the converting comprises generating an RGB signal from the image data of the luminance/chrominance system whose horizontal pixel number has been converted, and selecting one color component data from each odd number pixel in a first line of the RGB signal, selecting one color component data from each even number pixel in a second line of the RGB signal adjacent to the first line thereof, and converting the number of horizontal pixels of the RGB signal to the number of horizontal pixels suitable for display on the display panel; and
 wherein color component data is selected from the RGB signal so that the selected data form a color component arrangement identical to that of the RGB dots on the display panel, and color component data of one color is selected so that the color component data of the selected one color in the first line of the RGB signal are shifted horizontally by three pixels from the second line of the RGB signal that is adjacent to the first line thereof.

* * * * *